US011656484B2

(12) United States Patent
Lee et al.

(10) Patent No.: US 11,656,484 B2
(45) Date of Patent: May 23, 2023

(54) VOLTAGE-TUNABLE POLARIZER

(71) Applicant: THE REGENTS OF THE UNIVERSITY OF MICHIGAN, Ann Arbor, MI (US)

(72) Inventors: Somin Eunice Lee, Ann Arbor, MI (US); Yipei Wang, Ann Arbor, MI (US); Yunbo Liu, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 299 days.

(21) Appl. No.: 16/761,826

(22) PCT Filed: Nov. 9, 2018

(86) PCT No.: PCT/US2018/060128
§ 371 (c)(1),
(2) Date: May 6, 2020

(87) PCT Pub. No.: WO2019/094793
PCT Pub. Date: May 16, 2019

(65) Prior Publication Data
US 2021/0208427 A1    Jul. 8, 2021

Related U.S. Application Data

(60) Provisional application No. 62/583,685, filed on Nov. 9, 2017.

(51) Int. Cl.
*G02F 1/01* (2006.01)
*G02B 5/30* (2006.01)
(Continued)

(52) U.S. Cl.
CPC ......... *G02F 1/0136* (2013.01); *G02B 5/3025* (2013.01); *G02F 1/13471* (2013.01); *G02F 1/133531* (2021.01); *G02F 1/133638* (2021.01)

(58) Field of Classification Search
CPC .................................................. G02F 1/0136
See application file for complete search history.

(56) References Cited

U.S. PATENT DOCUMENTS 4,232,948 A    11/1980  Shanks
5,347,382 A     9/1994  Rumbaugh
(Continued)

FOREIGN PATENT DOCUMENTS

JP       2016145924 A       8/2016

OTHER PUBLICATIONS

International Search Report and Written Opinion issued in PCT/US2018/060128 dated Mar. 15, 2019; ISA/US.
(Continued)

*Primary Examiner* — Edmond C Lau
(74) *Attorney, Agent, or Firm* — Harness, Dickey & Pierce, P.L.C.

(57) ABSTRACT

Precise polarimetric imaging of polarization-sensitive nanoparticles is essential to resolving their accurate spatial positions beyond the diffraction limit. However, conventional technologies typically employ mechanically rotated optical components, causing beam deviation errors that cannot be corrected beyond the diffraction limit. To overcome this limitation, a spatially stable nano-imaging system is presented for polarization-sensitive nanoparticles. In this disclosure, it is demonstrated that by integrating a voltage-tunable polarizer into optical microscopy, one is able to achieve high precision nano-imaging without mechanically induced image shift. It is also demonstrated that by inte-
(Continued)

grating a voltage-tunable polarizer into photographic imaging system, one can achieve high-speed suppression of reflection glare and/or high-speed variation light exposure to the imager. By applying amplitude-modulated voltages, high-speed rotation of the transmission polarization and/or modulation of transmission intensity can be achieved for dynamic polarimetric nano-imaging. In addition, it is also demonstrated that by integrating a voltage-tunable polarizer into a photographic camera system, one is able to remove glare from object surfaces for providing images with more contrast, and control the variable light exposure as a variable neutral density filter.

5 Claims, 18 Drawing Sheets

(51) Int. Cl.
*G02F 1/1335* (2006.01)
*G02F 1/13363* (2006.01)
*G02F 1/1347* (2006.01)

(56) References Cited

U.S. PATENT DOCUMENTS

| | | |
|---|---|---|
| 5,847,790 A | 12/1998 | Andersson et al. |
| 2004/0085499 A1 | 5/2004 | Baek |
| 2009/0135422 A1 | 5/2009 | Miller et al. |
| 2009/0262284 A1 | 10/2009 | Hamilton |
| 2016/0216556 A1* | 7/2016 | Du .................. G09G 3/003 |
| 2016/0231582 A1* | 8/2016 | Yamaguchi .......... G02B 27/286 |

OTHER PUBLICATIONS

Safrani A et al: "Liquid-crystal polarization rotator and a tunable polarizer", Optics Letters, Optical Society of America, US. vol. 34, No. 12, Jun. 15, 2009 (Jun. 15, 2009), pp. 1801-1803, XP001523590, ISSN: 0146-9592, DOI: 10.1364/OL.34.001801.
CA Japanese Office Action regarding Patent Application No. 2020525966, dated Aug. 24, 2022.
European Office Action regarding Patent Application No. 18876923.6, dated Feb. 27, 2023.
Chinese First Office Action from counterpart CN2018800727099, dated Mar. 1, 2023.

* cited by examiner ii. Unstable nano-imaging iii. Non-correctable sub-pixel errors Nano-image        Beam deviation error
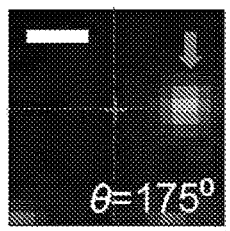
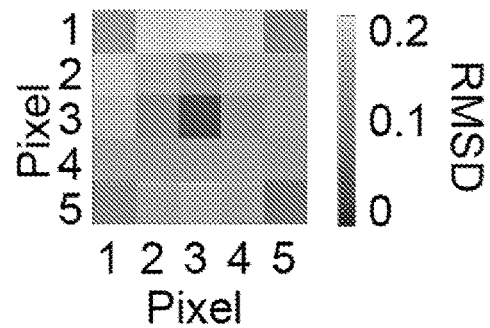
FIG. 11A
FIG. 11B
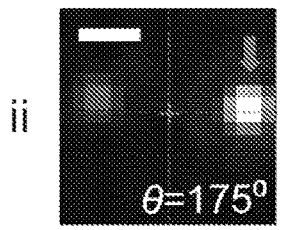
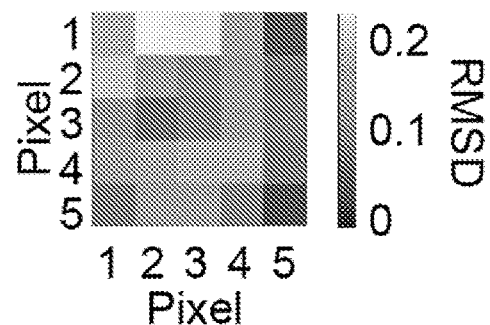
FIG. 11C
FIG. 11D
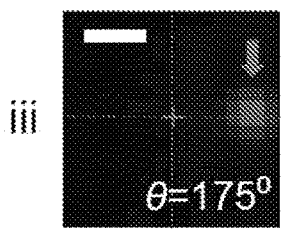
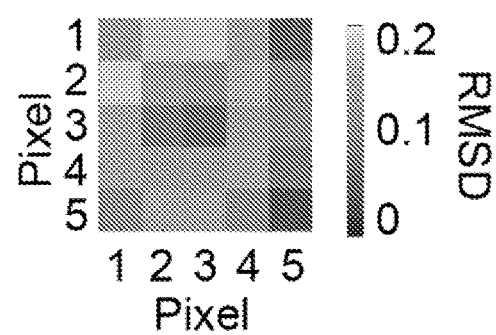
FIG. 11E
FIG. 11F

Nano-image

Beam deviation error

90 Degree

60 Degree

30 Degree

0 Degree

VOLTAGE-TUNABLE POLARIZER

CROSS-REFERENCE TO RELATED APPLICATIONS

This application is a 371 U.S. National Phase of International Application No. PCT/US2018/060128, filed Nov. 9, 2018, which claims priority to U.S. Provisional Application No. 62/583,685, filed Nov. 9, 2017. The entire disclosures of the above applications are incorporated herein by reference.

GOVERNMENT CLAUSE

This invention was made with government support under Grant No. ECCS-1454188 awarded by the National Science Foundation and Grant No. FA9550-16-1-0272 awarded by the United States Air Force/Air Force Office of Scientific Research. The Government has certain rights in this invention.

FIELD

The present disclosure relates to a voltage-tunable polarizer applied to as well as a nano-imaging system for resolving polarization-sensitive nanoparticles beyond diffraction limit and to a photographic camera system for glare removal and for variable light exposure.

BACKGROUND

Analyzing individual polarization-sensitive nanoparticles allows for spatially resolving actual distributions within a heterogeneous population beyond the diffraction limit. Whereas ensemble studies provide a blended average, polarimetric imaging of individual nanoparticles can reveal their orientation. By rotating the polarization to align with the axes of anisotropic nanoparticles, orientational information can be extracted, giving rise to the nature of their local microenvironment. Notably, polarimetric imaging of each individual nanoparticle has the potential to ascertain the precise spatial position (nm) of each constituent nanoparticle within a heterogeneous distribution. However, previous implementations utilize mechanical approaches in order to rotate the polarization. Thus, resulting images are prone to beam deviation errors due to inherent mechanical and manufacturing limitations (surface defects, mechanical wobble, etc.). While beam deviation errors can be corrected using image processing at the micrometer scale, this disclosure theoretically and experimentally shows these corrections are not sufficient at the sub-pixel scale to accurately correct spatial positions of individual nanoparticles.

In this disclosure, a voltage-tunable polarizer is presented which may be used for resolving polarization-sensitive nanoparticles beyond the diffraction limit. In one example, a voltage-tunable polarizer is integrated with an optical microscopy, to stably image single plasmonic nanoparticles beyond the pixel limit. Here, voltage, rather than mechanical rotation, is used to dynamically tune the transmission polarization angle and eliminate beam deviations. It is demonstrated that the transmission polarization angle ($\theta$) can be rapidly tuned for dynamic, high-speed polarimetric nano-imaging. It is also shown that the nano-imaging system results in spatially stable and reproducible polarimetric nano-images (from $\theta_1$ to $\theta_2$) compared to conventional setups with mechanically rotated polarizers which introduce non-correctible errors when the images shift across pixels.

In another example, the voltage-tunable polarizer is integrated with a photographic camera, to remove polarized or partially polarized reflections from object surfaces for providing images with more details and/or contrast. It is demonstrated that when the voltage-tunable polarizer is turned on and the tuning angle is perpendicular to the polarization state of the reflected light from the object to be imaged, the reflection glare is suppressed and the details on the imaged object (such as written letters) is revealed. The voltage-tunable polarizer may also be used as a variable neutral density filter for photographic purposes to provide variable transmission intensity and variable light exposure.

Voltage-tunable polarizer has applications in still and live photography in automotive camera systems, ship/boat camera systems, underwater camera systems, flight/plane camera systems, consumer electronics camera systems (laptop, cell phone, etc.), space shuttle camera systems, autonomous camera systems, surveillance camera systems, scientific camera systems, etc. Voltage-tunable polarizer also has applications in sensor enabled eye glass wear, adjustable smart glasses, etc.

This section provides background information related to the present disclosure which is not necessarily prior art.

DRAWINGS

The drawings described herein are for illustrative purposes only of selected embodiments and not all possible implementations, and are not intended to limit the scope of the present disclosure.

Figure 7A:
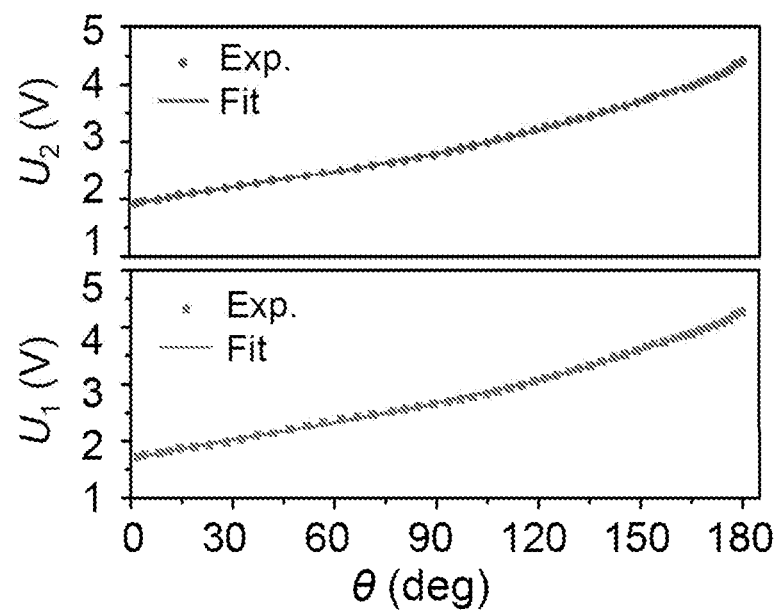
FIG. 7A are graphs showing dependence of the voltages on the rotations of the transmission polarization axis ($\theta$). The experimental data and its polynomial fit are plotted for both liquid crystal retarders (bottom for LC1 actuation voltage $U_1$ and top for LC2 actuation voltage $U_2$).
Figure 7B:
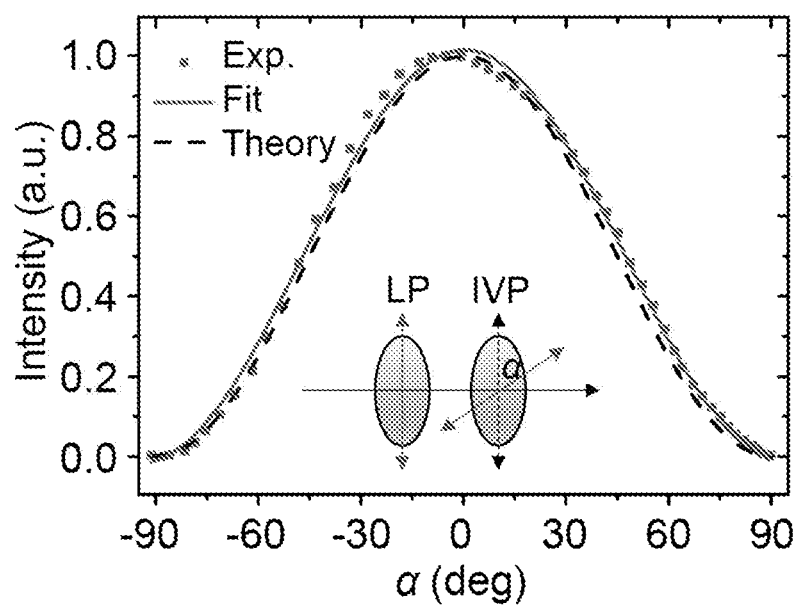

FIG. 7B is a graph showing polarization performance for the voltage-tunable polarizer. Transmitted light intensity with different polarization angles show excellent match to Malus's law (black line). The experimental data (red dots) was obtained by rotating the voltage-tunable polarizer after a linear polarizer (a is the angle between the transmission axes of the polarizer and the linear polarizer, inset) and then fitted to a sinusoidal function (red line). A and B in the figure represent linear polarizer and voltage-tunable polarizer, respectively.

Figure 7C:
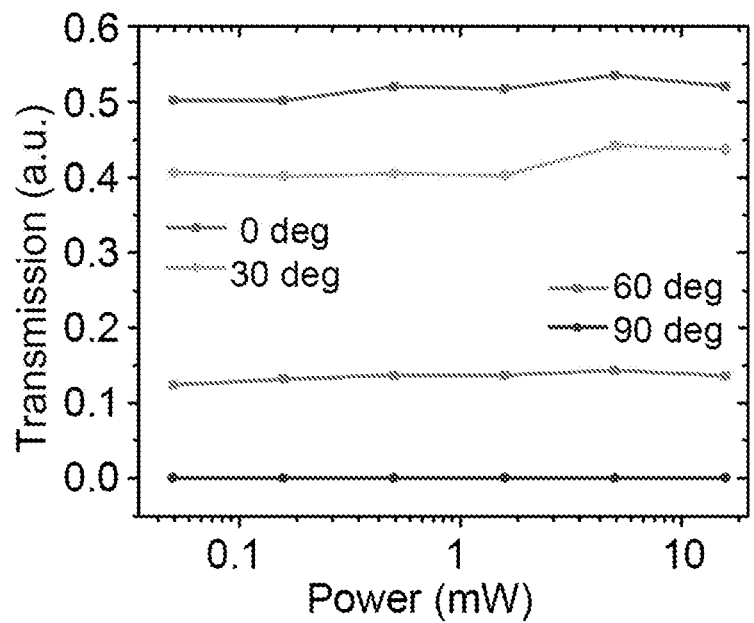

FIG. 7C is a graph showing uniformity over input power; transmission for different polarization angles (red line, 0 degrees; green line, 30 degrees; blue line, 60 degrees; purple line, 90 degrees) is shown over a broad input power range.

Figure 7D:
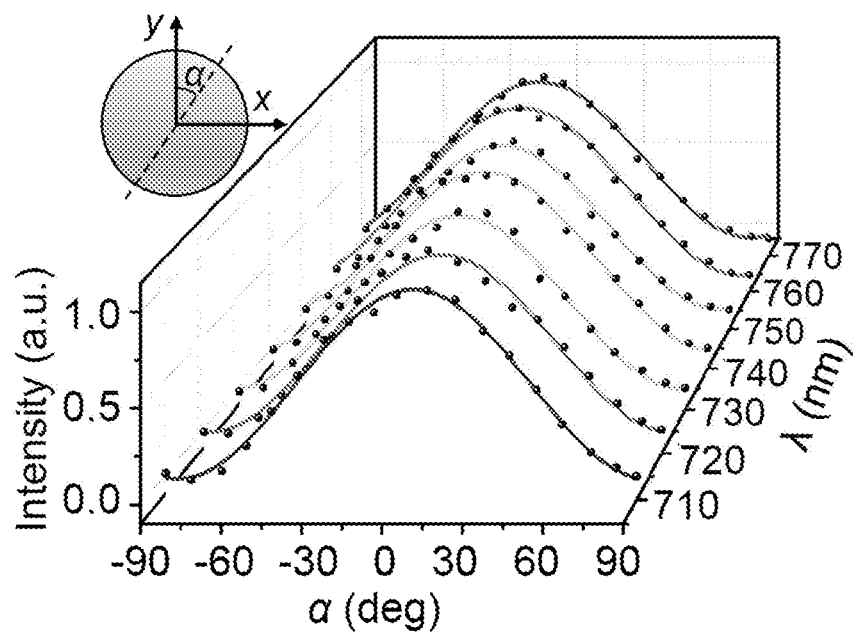

FIG. 7D is a graph showing uniformity over different wavelengths. Consistent polarization performance over a wide range of wavelengths (λ) from 710 nm to 770 nm, where in the inset, the transmission axis of the first linear polarizer (LP) is set to be aligned with the y-axis, and the angle α is the angle between transmission axes of the linear polarizer and the voltage-tunable polarizer. A and B in the figure represent linear polarizer and voltage-tunable polarizer, respectively.

Figure 8A:
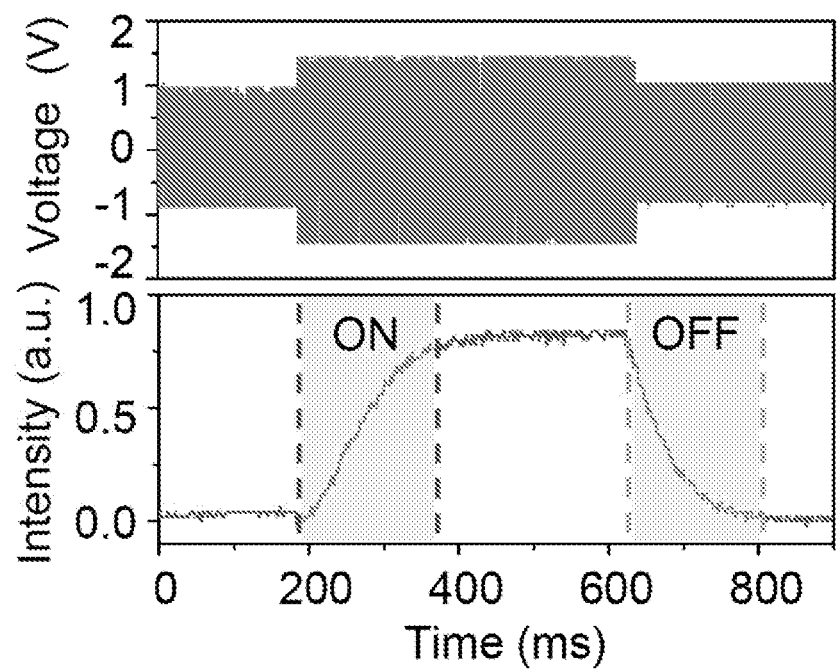

FIG. 8A are graphs showing turn-on and turn off switching of the voltage-tunable polarizer. In the top graph, actuation voltages are shown for LC1, where the low and high voltage levels are 1.86 V and 2.88 V (blue waveform), corresponding to rotating the polarization axis from perpendicular (off state) to parallel (on state) direction with respect to the incoming light polarization. Both voltage levels are in the form of a 250 Hz square wave. In the bottom graph, response time analysis is shown. Transmitted light intensity (red line) of the voltage-tunable polarizer under the amplitude-modulated voltages. The first and second shaded areas represent the response time of the turn-on and turn-off switching, respectively.

Figure 8B:
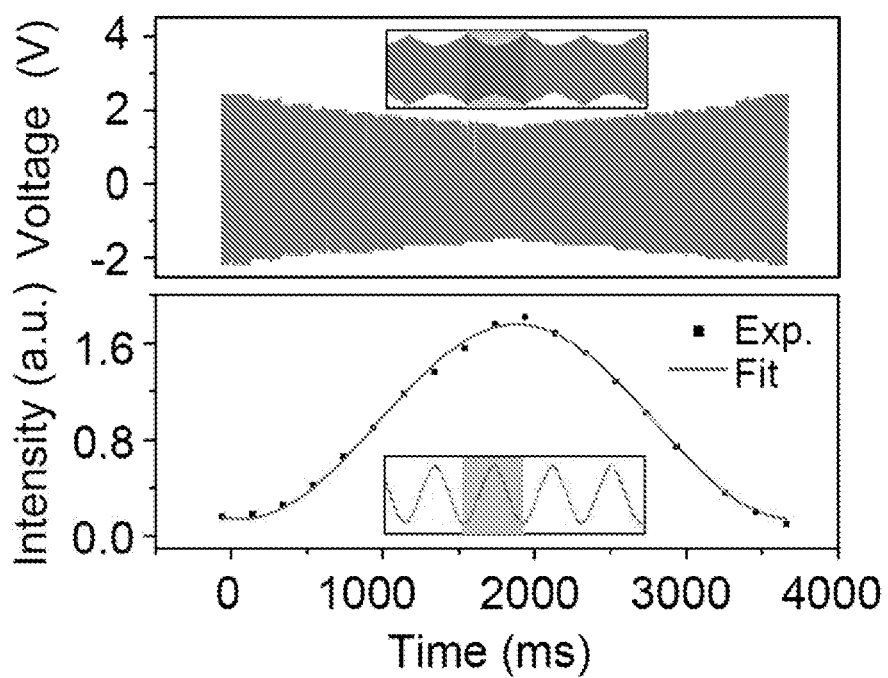

FIG. 8B are graphs showing temporal performance of the voltage-tunable polarizer. In the top graph, transmitted light intensity of one period is shown under dynamic actuation (black dots, experimental data; red line, sinusoidal fit), where the top inset is high repeatable performance over multiple periods. In the bottom graph, actuation voltages are shown for operating the LC1 (one period), which is imposed of 19 discrete voltage levels corresponding to rotating transmission axis from 0° to 90° and back to 0°, where the bottom inset is actuation voltages of multiple periods.

Figure 8C:
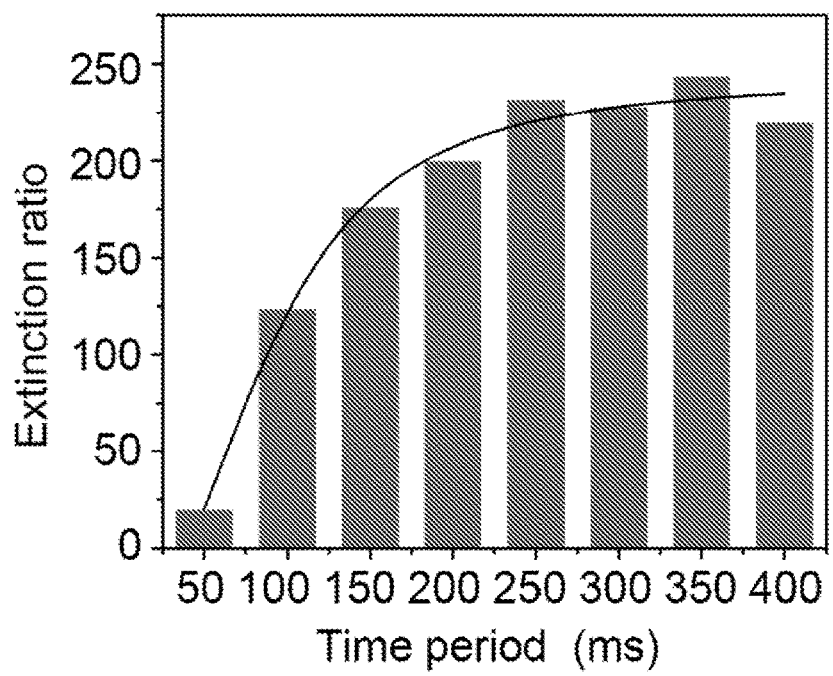

FIG. 8C is a graph showing the trade-off relations between the time period (i.e., rotation speed) and the extinction ratio, where the experimental data and its nonlinear fit are plotted as a red bar and black line, respectively.

Figure 8D:
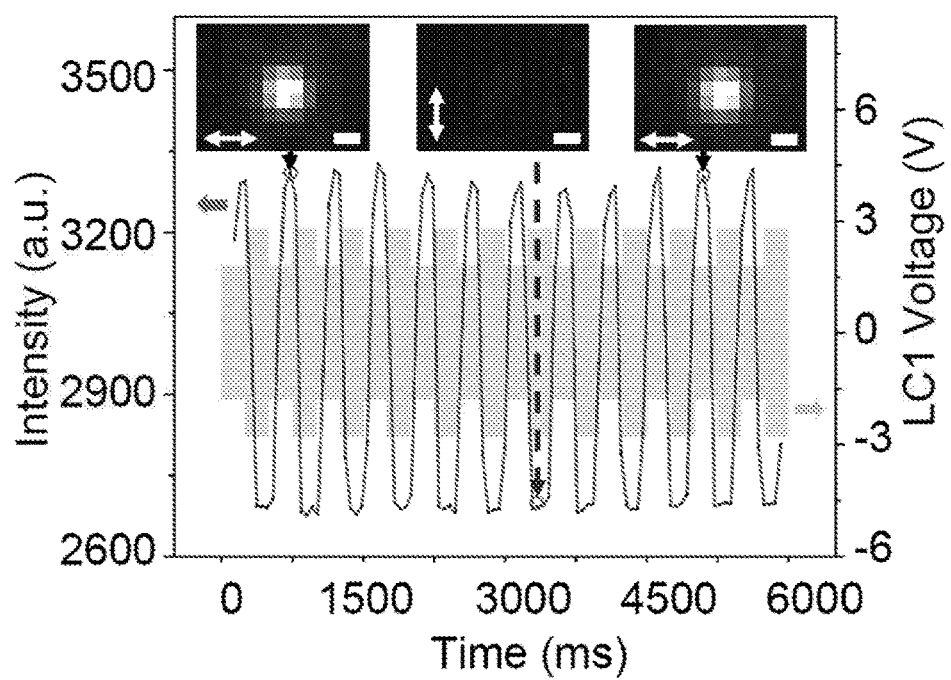

FIG. 8D is a graph showing that a voltage-tunable polarizer enables high-speed polarimetric nano-imaging. A gold nanorod was imaged at high-speed by dynamic rotation of the transmission polarization axis through the voltage-tunable polarizer. The measured average intensity of the nanorod over time is plotted as the line and the actuation voltage over time for LC1 is plotted in the waveform. Insets, nanorod dark-field images with transmission polarization directions parallel (horizontal arrow) and perpendicular (vertical arrow) to its long axis (scale bar 500 nm).

Figure 9A:
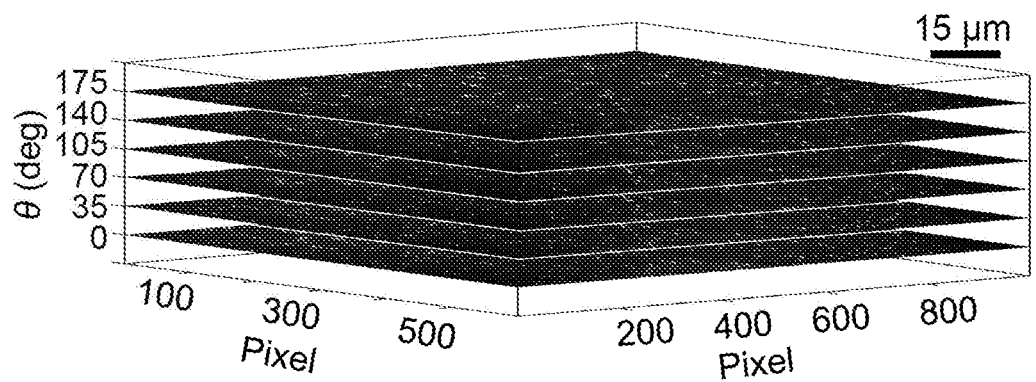

FIG. 9A is a large field-of-view single nanorods polarimetric image; single nanorods on a glass substrate was imaged.

Figure 9B:
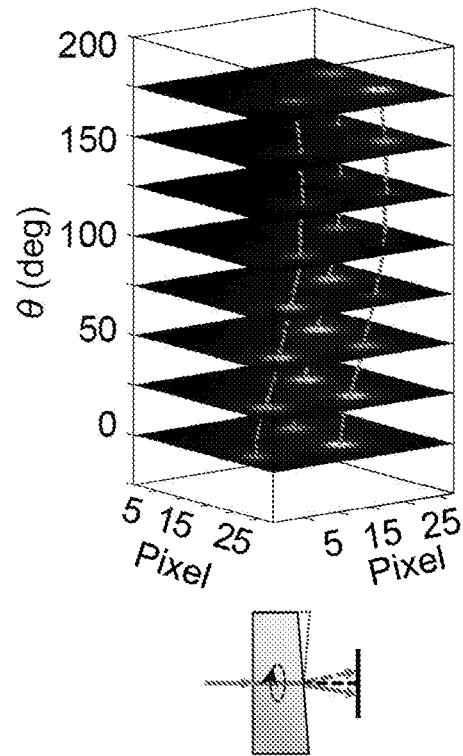
Figure 9C:
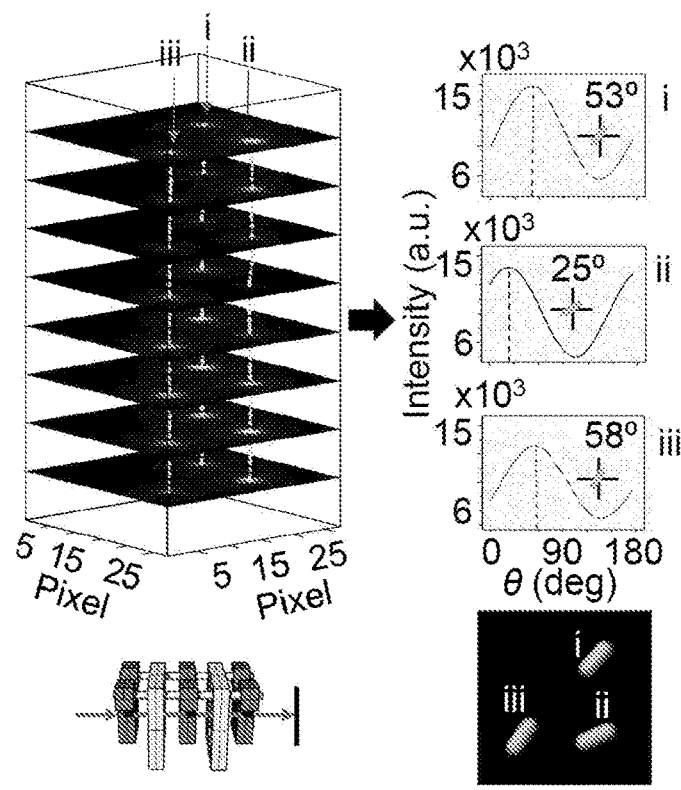

FIGS. 9B and 9C are 3D images illustrating the spatial precision of the voltage-tunable polarizer. In FIG. 9C, a representative region of interest composed of three single nanorods (labelled as i, ii, and iii) are shown in the stacked 3D images. The position of the gold nanorods obtained by voltage-tunable polarizer is traced in cyan (right stack), showing stable nano-imaging. As a comparison, the positions of the gold nanorods obtained by mechanically rotated polarizer are traced in red in FIG. 9B, showing large beam deviation and image shift. The intensity of the rods are plotted (on right of FIG. 9C) and the orientation information of the nanorods can be deduced as ~53° for i, ~25° for ii, and ~58° for iii respectively (illustrated in the insets and lower right corner).

Figure 10:
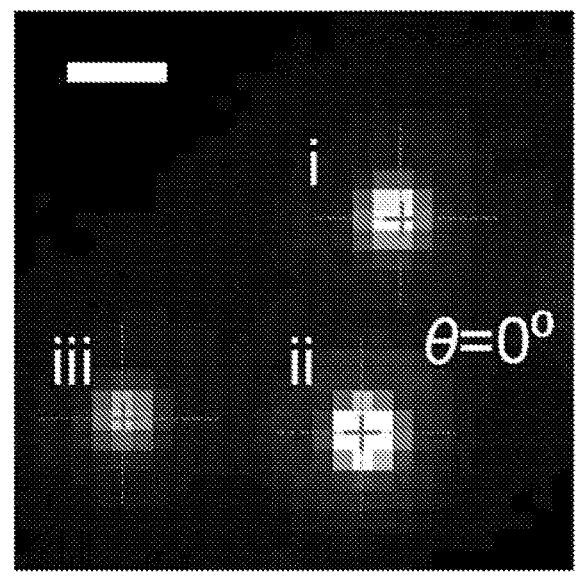
Figure 12A:
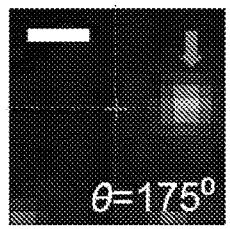
Figure 12B:
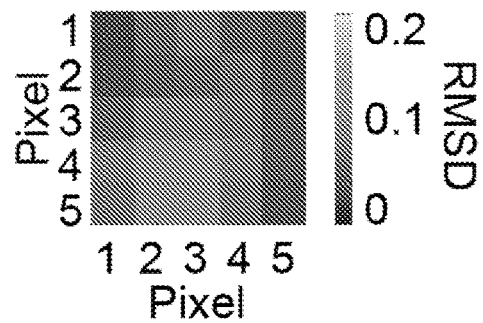
Figure 12C:
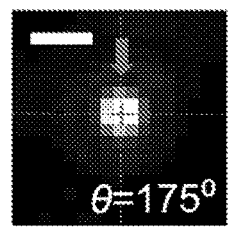
Figure 12D:
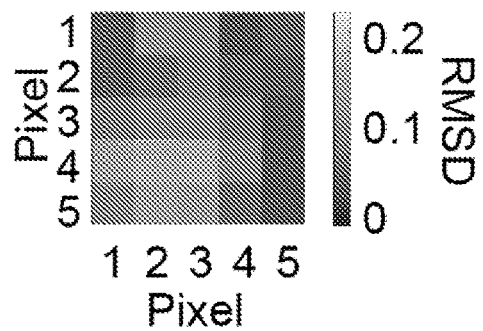
Figure 12E:
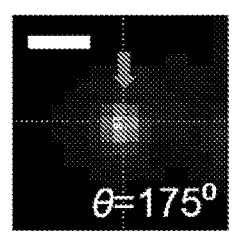
Figure 12F:
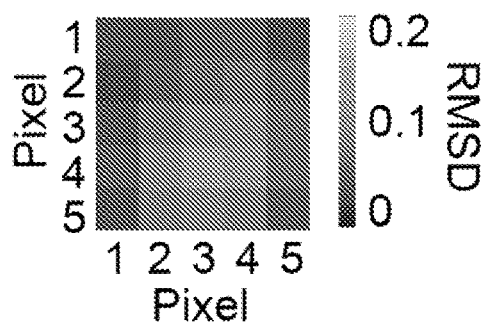

FIG. 10 is the nano-image is at 0° polarization: three single gold nanorods (labelled i, ii, and iii) were imaged using both voltage-tunable polarizer and mechanically rotated polarizer (scale bar is 1 μm).

FIG. 11A-11F are nano-images of the three nanorods from FIG. 10 at 175° from mechanically rotated polarizer and corresponding beam deviation errors (RMSD). The resulting nano-images from the mechanically rotated polarizer setup were spatially corrected so they can be compared with those from a voltage-tunable polarizer. The nano-images from the voltage-tunable polarizer were shown without any spatial correction. The red cross-hair indicates the center pixel at 0°. For each nanorod, the intensity of each pixel was fitted to a sinusoidal function and the beam deviation error was calculated in terms of its normalized root-mean-square deviation (RMSD).

FIG. 12A-12F are the nano-images of the three nanorods from FIG. 10 at 175° from voltage-tunable polarizer and corresponding beam deviation errors (RMSD). The nano-images from the voltage-tunable polarizer were shown without any spatial correction. The red cross-hair indicates the center pixel at 0°.

Figure 13A:
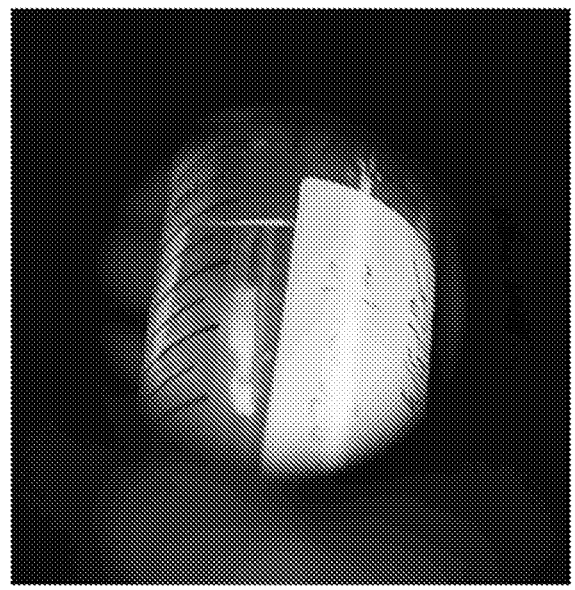
Figure 13B:
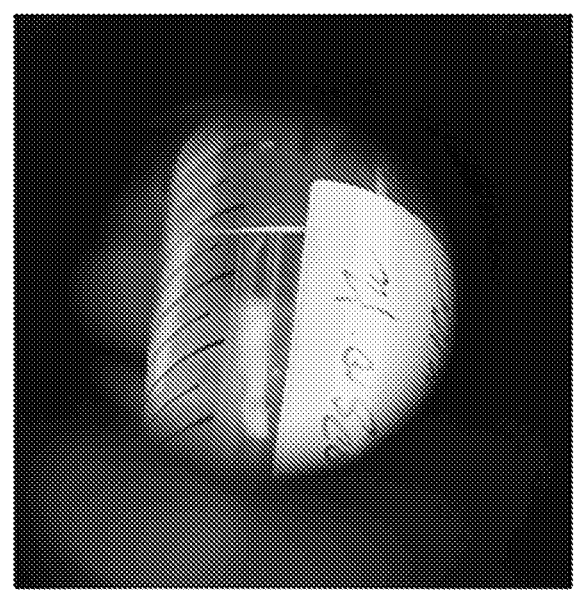
Figure 14D:
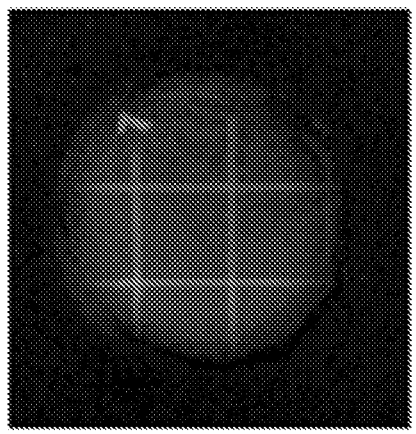
Figure 14C:
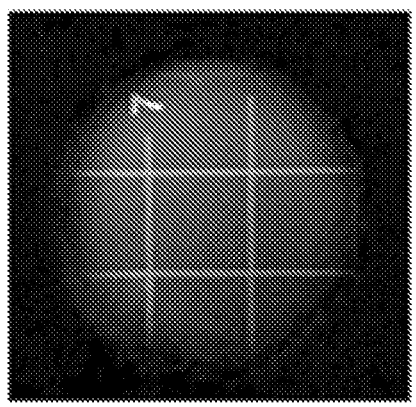
Figure 14B:
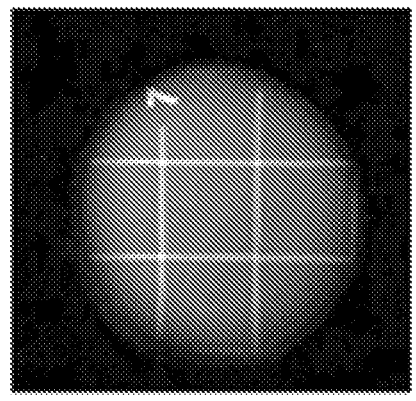
Figure 14A:
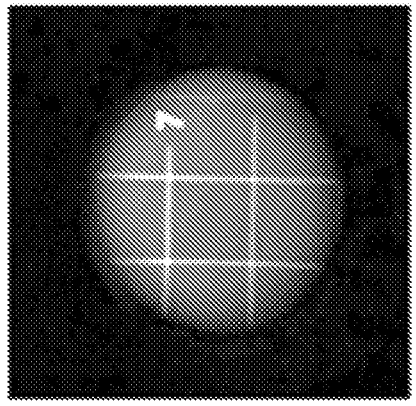

FIGS. 13A and 13B are photographic images taken with the voltage-tunable polarizer at on state versus at off state. The partially polarized reflection glare from the object are removed when the voltage-tunable polarizer is turned on, showing a clear image of the letters written on the object.

FIGS. 14A-14D are the photographic images illustrating the voltage-tunable polarizer functioning as a neutral density filter. The images are taken as the polarization angle of the voltage-tunable polarizer is tuned from 0 degree to 90 degrees for a polarized input light. The image intensity varies as a result of the polarizer tuning angle changes.

Figure 15A:
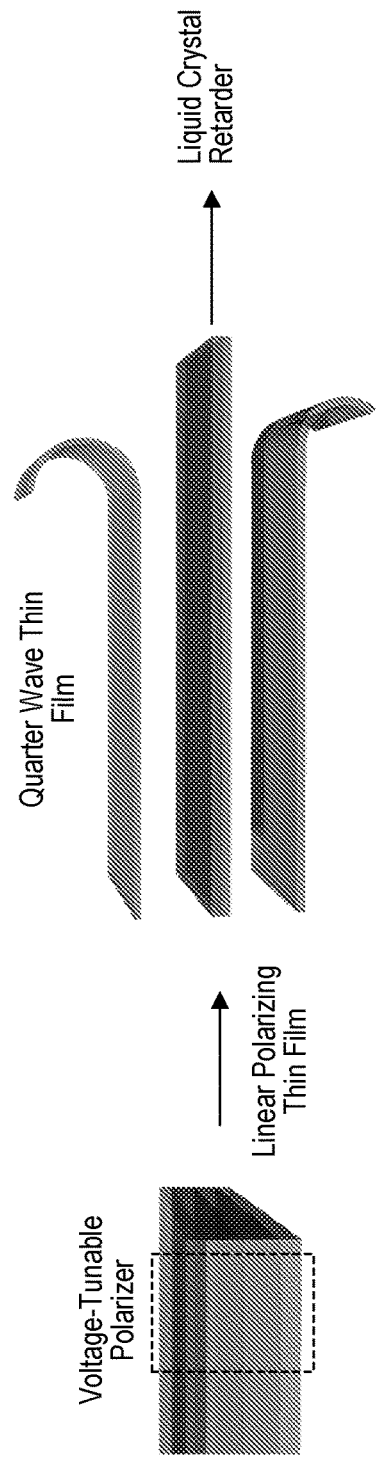
Figure 15B:
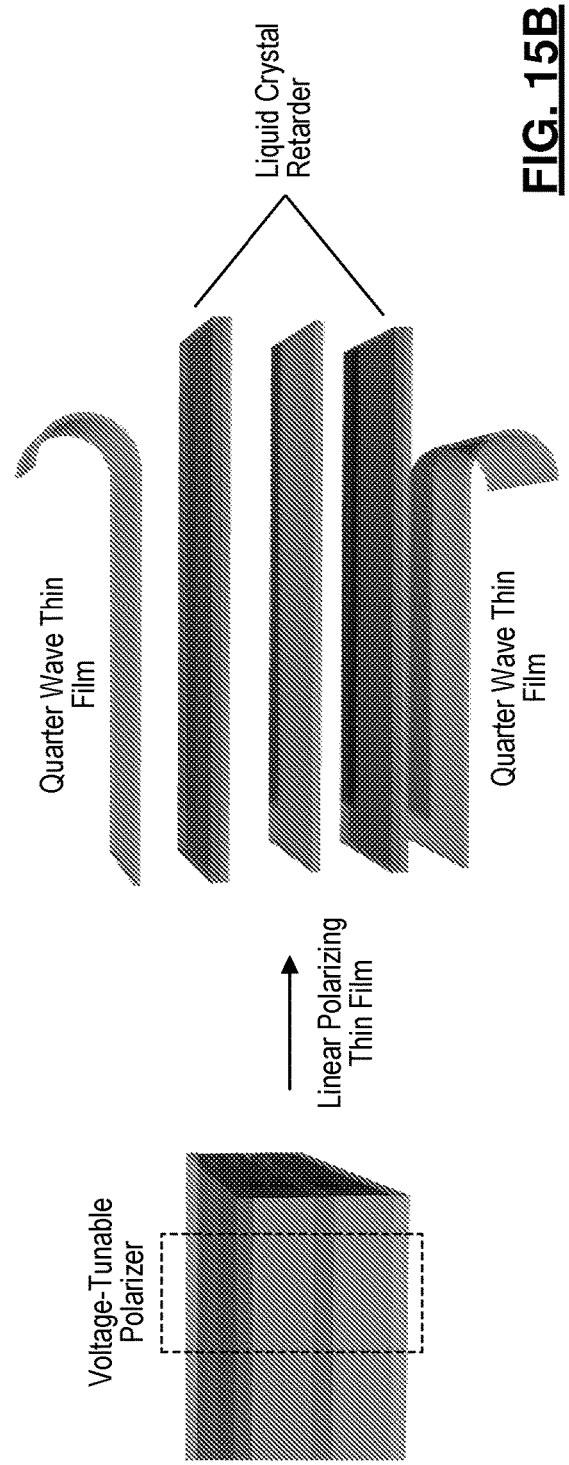

FIGS. 15A and 15B describe the structures of two embodiments of the voltage-tunable polarizer of which the linear polarizer is replaced with linear polarizing thin film, the quarter wave plate is replaced with quarter wave retarder thin film and the liquid crystal cell is replaced with a fabricated liquid crystal retarder using thin-film bottom-up process.

Figure 16:
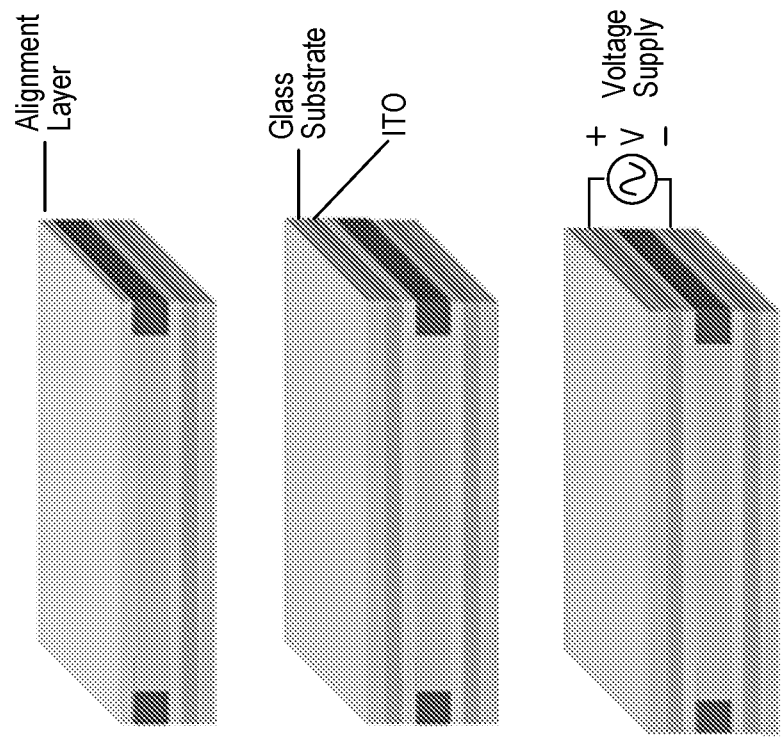
Figure 16:
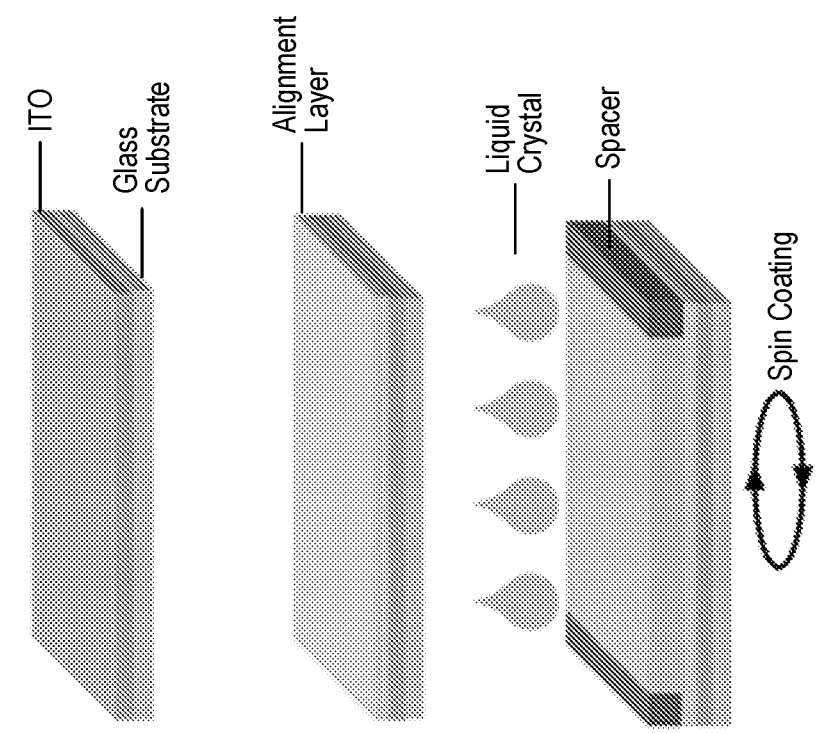

FIG. 16 illustrates a bottom-up, thin-film fabrication process for a liquid crystal retarder with minimum device thickness.

Corresponding reference numerals indicate corresponding parts throughout the several views of the drawings.

DETAILED DESCRIPTION

Example embodiments will now be described more fully with reference to the accompanying drawings.

Figure 1A:
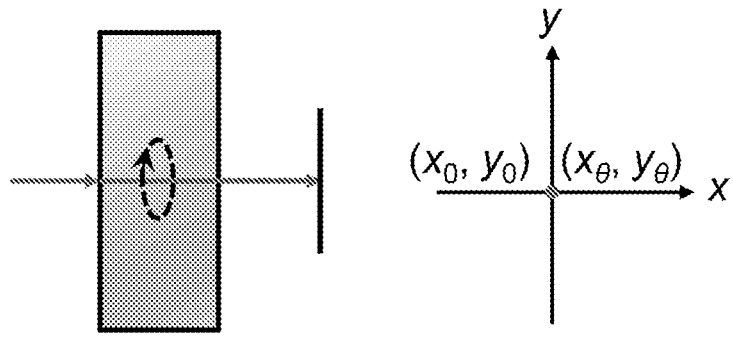
FIG. 1A is a diagram depicting no beam deviation after rotation of a polarizer in an ideal case.
Figure 2A:
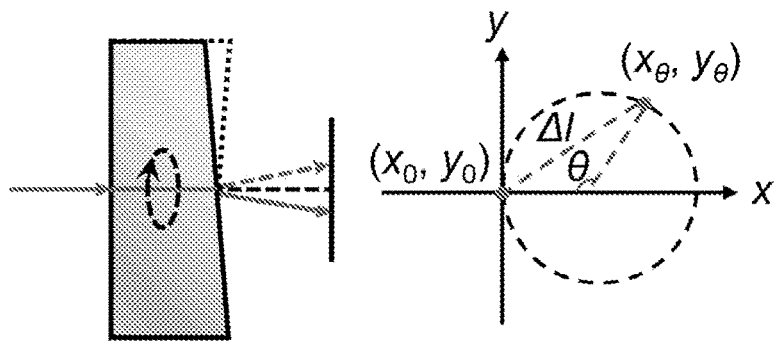
FIG. 2A is a diagram depicting beam deviation due to non-parallelism of the polarizer.

In polarimetric nano-imaging systems, the beam deviation (Δl) caused by the mechanical rotation of conventional polarizers can be defined as $$\Delta l = \sqrt{(x_\theta - x_0)^2 + (y_\theta - y_0)^2}, \qquad (1)$$

where θ is the rotation angle, (x0, y0) and (xθ, yθ) are the spatial coordinates of the beam center before and after the rotation of the polarizer. Ideally, xθ and yθ should be equal to x0 and y0 regardless of the rotation as seen in FIG. 1A. However, in real cases, a non-zero Δl arises from the mechanical and manufacturing limitations. Among them, non-parallelism between the two optical surfaces of the polarizer is one of the main contributors as seen in FIG. 2A, in which the spatial coordinate of the beam center after the rotation can be expressed as $$\begin{cases} x_\theta = d\sigma(n-1)(1-\cos\theta) \\ y_\theta = d\sigma(n-1)\sin\theta \end{cases} \quad (2)$$

where d is the distance between the imager (e.g., charged-coupled device (CCD)) and the polarizer, n is the refractive index and σ is the non-parallel angle between two surfaces of the polarizer. By substituting the Eq. (2) into the Eq. (1), the beam deviation with respect to θ can be obtained as $$\Delta l(\theta) = 2\sin\frac{\theta}{2}d(n-1)\sigma, \quad (3)$$

In one example, d, σ, and n are assumed to be 50 mm, 5 arc sec, and 1.45, respectively. The rotation of the polarizer will cause the beam to trace out a ~1.1-μm diameter circle at the imaging plane. For polarimetric nano-imaging, such beam deviation gives rise to a significant intensity error, which cannot be fully corrected beyond the diffraction limit by image processing. For better understanding, the angular rotation of the polarizer can be written in terms of Mueller matrices operating on the Stokes vector $$\begin{bmatrix} I \\ Q \\ U \\ V \end{bmatrix} = \frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix}\begin{bmatrix} 1 & 0 & 0 & 0 \\ 0 & \cos 2\theta & \sin 2\theta & 0 \\ 0 & -\sin 2\theta & \cos 2\theta & 0 \\ 0 & 0 & 0 & 1 \end{bmatrix}\begin{bmatrix} I_s \\ Q_s \\ U_s \\ V_s \end{bmatrix}, \quad (4)$$

where $[I, Q, U, V]^T$ is the output Stokes vector and $[I_s, Q_s, U_s, V_s]^T$ is the Stokes vector of the light scattered by the nanostructures. For the CCD, it is only the intensity I and its dependence with θ that can be measured, which can be expressed as $$I(\theta) = \frac{1}{2}(I_s + Q_s\cos 2\theta + U_s\sin 2\theta). \quad (5)$$

Figure 1B:
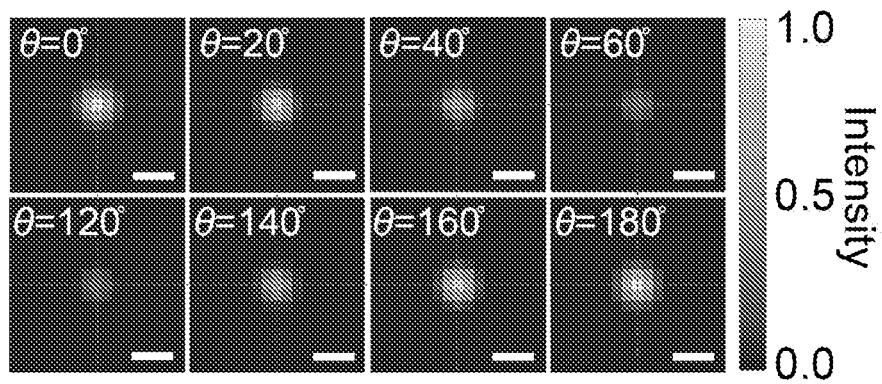
FIG. 1B depict simulated stable images of a single plasmonic nanorod after rotating the polarizer at different increments.
Figure 1C:
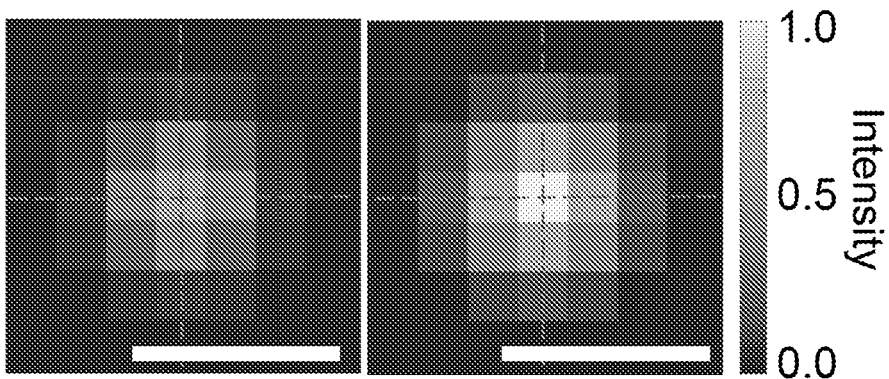
FIG. 1C are close-up views of select simulated images from FIG. 1B showing accurate spatial distribution.
Figure 2B:
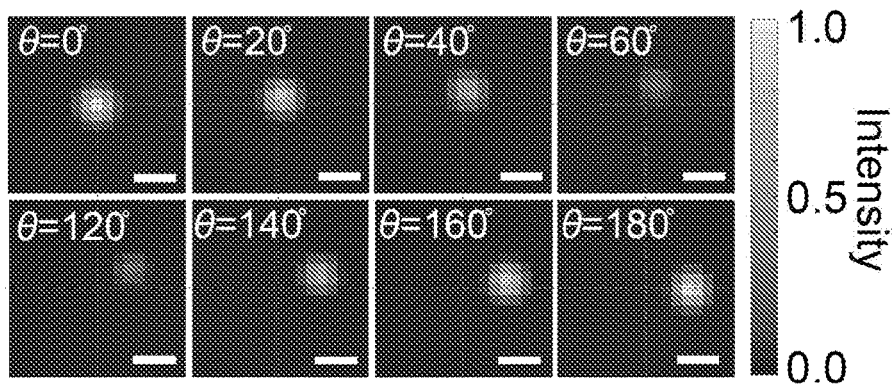
FIG. 2B depict simulated unstable images of a single plasmonic nanorod after mechanically rotating the polarizer at different increments.
Figure 2C:
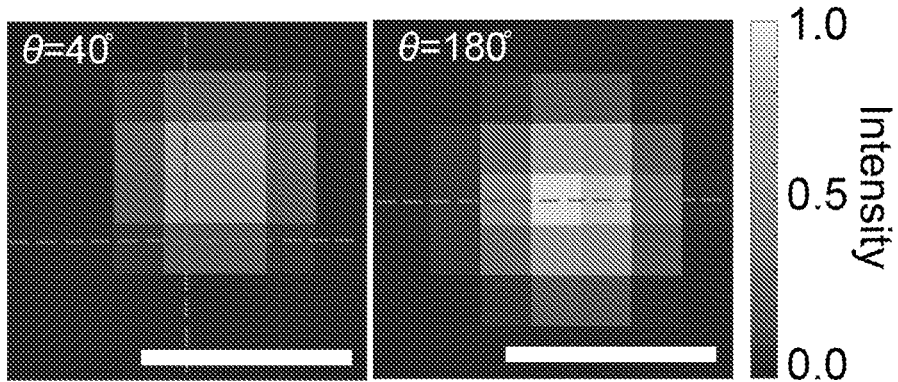
FIG. 2C are close-up views of select simulated images from FIG. 2B showing non-correctable beam deviation errors at sub-pixel scale.

Meanwhile, for nano-imaging, a gaussian point spread function can be used to describe the intensity distribution on the CCD $$I(x, y; \theta) = I(\theta)\exp\left[-2\left(\frac{(x-x_\theta)^2 + (y-y_\theta)^2}{\omega^2}\right)\right], \quad (6)$$

where ω is the waist radius. In experimental case, the actual output signal S (m, n; θ) from a CCD pixel (m, n) can be then given by $$S(m, n; \theta) = \int_{-\infty}^{+\infty}\int_{-\infty}^{+\infty} I(x, y; \theta)R(x-mp, y-nq)dxdy \quad (7)$$

where R(x, y) is the pixel response function (PRF), and p, q are the pixel pitch at x and y direction, respectively. Due to the non-uniform CCD pixel response (e.g., pixel-to-pixel and intra-pixel sensitivity variation), R(x,y) is different at different positions, resulting in an error in the output signal S (m, n; θ) during the rotation of the polarizer. In some cases, beam deviation errors at the pixel scale can be corrected using image processing (e.g., correcting the pixel-to-pixel variations). However, sub-pixel beam deviation errors cannot be eliminated even with an ideal PRF. As a typical case, by combining the Eq. (2) and Eq. (5-7), polarimetric nano-images of a single plasmonic nanorod with an ideal polarizer and a mechanically rotated polarizer were simulated by theoretical calculation as seen in FIGS. 1B and 2B, respectively. Simulation shows a significant beam deviation (image shift) at micrometer scales from the non-parallelism of the mechanically rotated polarizer. Moreover, even with an ideal PRF, the beam deviation at the sub-pixel scale changes the spatial distribution of the output signal sampled by the CCD, resulting in an inevitable intensity error for each pixel as seen in FIG. 2C. Such intensity variations lead to spatial instabilities in nano-imaging, and thus hinder resolving accurate spatial and polarimetric information of individual nanoparticles.

Figure 3A:
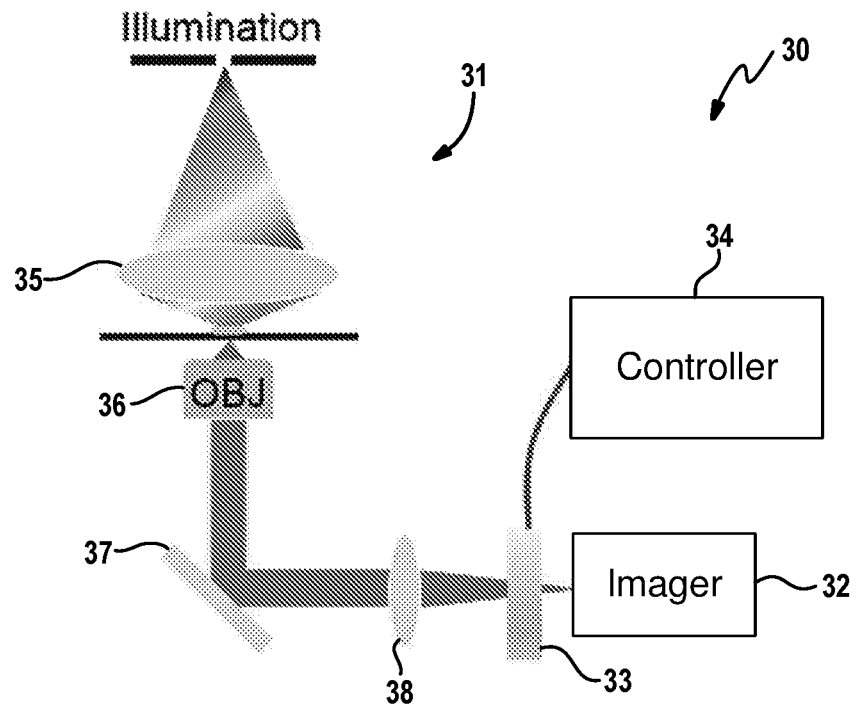
FIG. 3A is a block diagram of an example nano-imaging system.

FIG. 3A illustrates a nano-imaging system 30 for resolving polarization-sensitive nanoparticles beyond diffraction limit. The nano-imaging system 30 is comprised generally of an optical microscope 31, an imager 32, a voltage-tunable polarizer 33 and a controller 34.

The optical microscope 31 operates to project light onto a sample of interest. In one example embodiment, the optical microscope 31 is the IX73 microscope commercially available from Olympus. In this example, the optical microscope 31 uses dark-field imaging methods although other imaging methods are contemplated by this disclosure. The optical microscope 31 may be configured with a condenser 35, an objective lens 36, a beam splitter 37, a tube lens 38 and an integrated imager 32, such as a CCD camera. It is understood that the optical microscope 31 may include more, less or different optical components for directing the light along a light path to the imager 32. The imager 32 in turn captures an image of the sample of interest. It is also envisioned that the imager 32 may be integrated into or external from the remaining optical components which comprise the microscope. In some embodiments, the optical microscope 31 may not include the imager.

A voltage-tunable polarizer 33 is disposed in light path of the optical microscope. For example, the voltage-tunable polarizer 33 may be designed as an insert to fit into a polarizer port of the microscope 31 or another ports of the microscope 31. In response to a voltage applied thereto, the voltage-tunable polarizer 33 changes polarization state of light propagating through the polarizer without mechanical rotation of the polarizer itself. In a simple form, the voltage-tunable polarizer is implemented by a pair of liquid crystal variable retarders aligned in series in the light path of the microscope.

Figure 3B:
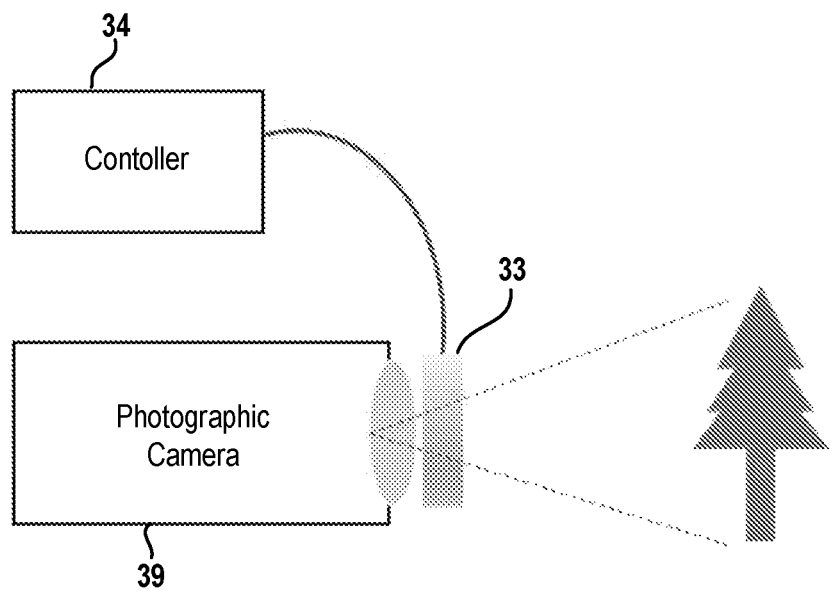
FIG. 3B is a block diagram of an example for photographic application.

FIG. 3B illustrates an example of photographic applications, where the voltage tunable polarizer 33 is integrated into a photographic camera 39. The system is comprised generally of a photographic camera 39, a voltage tunable polarizer 33 and a controller 34.

While references are made to a nano-imaging and photographic applications, it is readily understood that the voltage-tunable polarizer described herein has other applications, including but not limited to a neutral density filter for variable light exposure. The voltage-tunable polarizer has application for still and live photography in, automotive camera systems, ship/boat camera systems, underwater camera systems, flight/plane camera systems, consumer electronics camera systems (laptop, cell phone, etc.), space shuttle camera systems, autonomous camera systems, surveillance camera systems, scientific camera systems, etc. as well as application in sensor enabled eye glass wear, adjustable smart eye glass wear, etc.

Figure 4A:
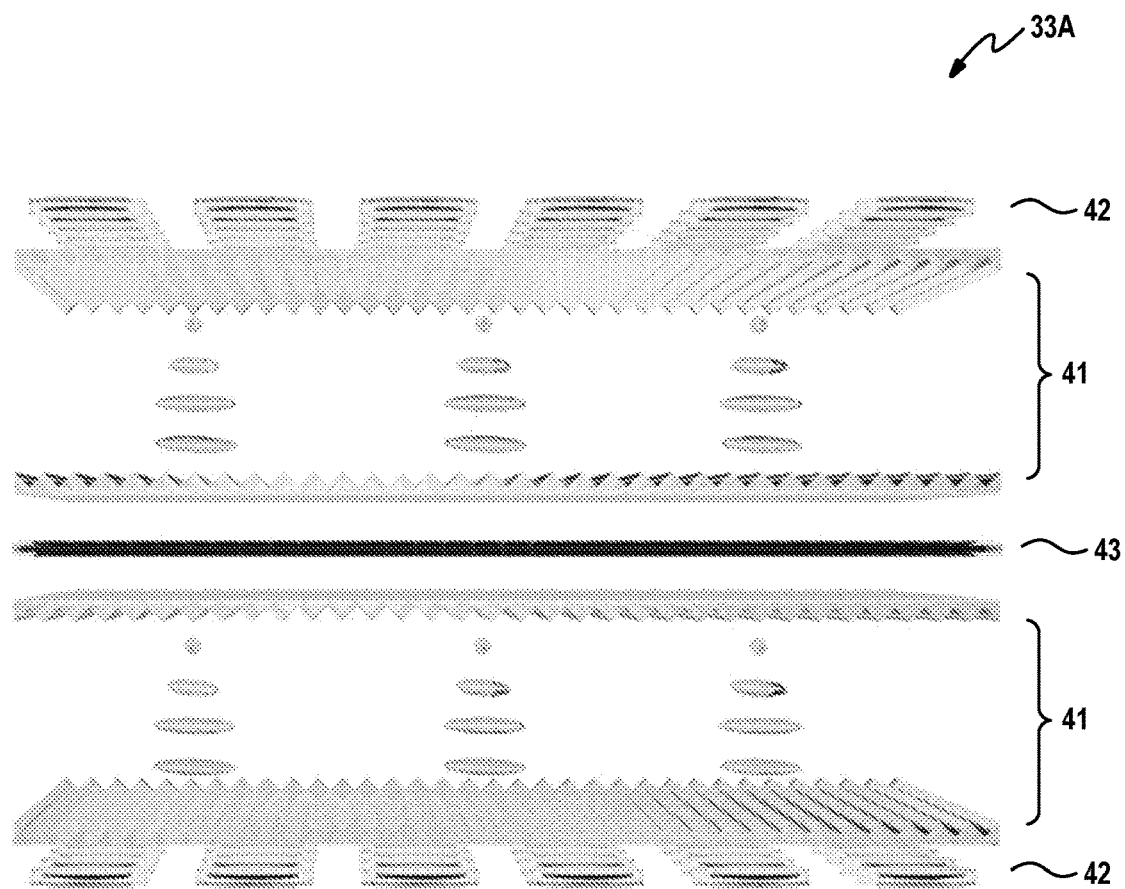
FIG. 4A is a cross-sectional exploded view of an example embodiment of a voltage-tunable polarizer.
Figures 5A, 5B:
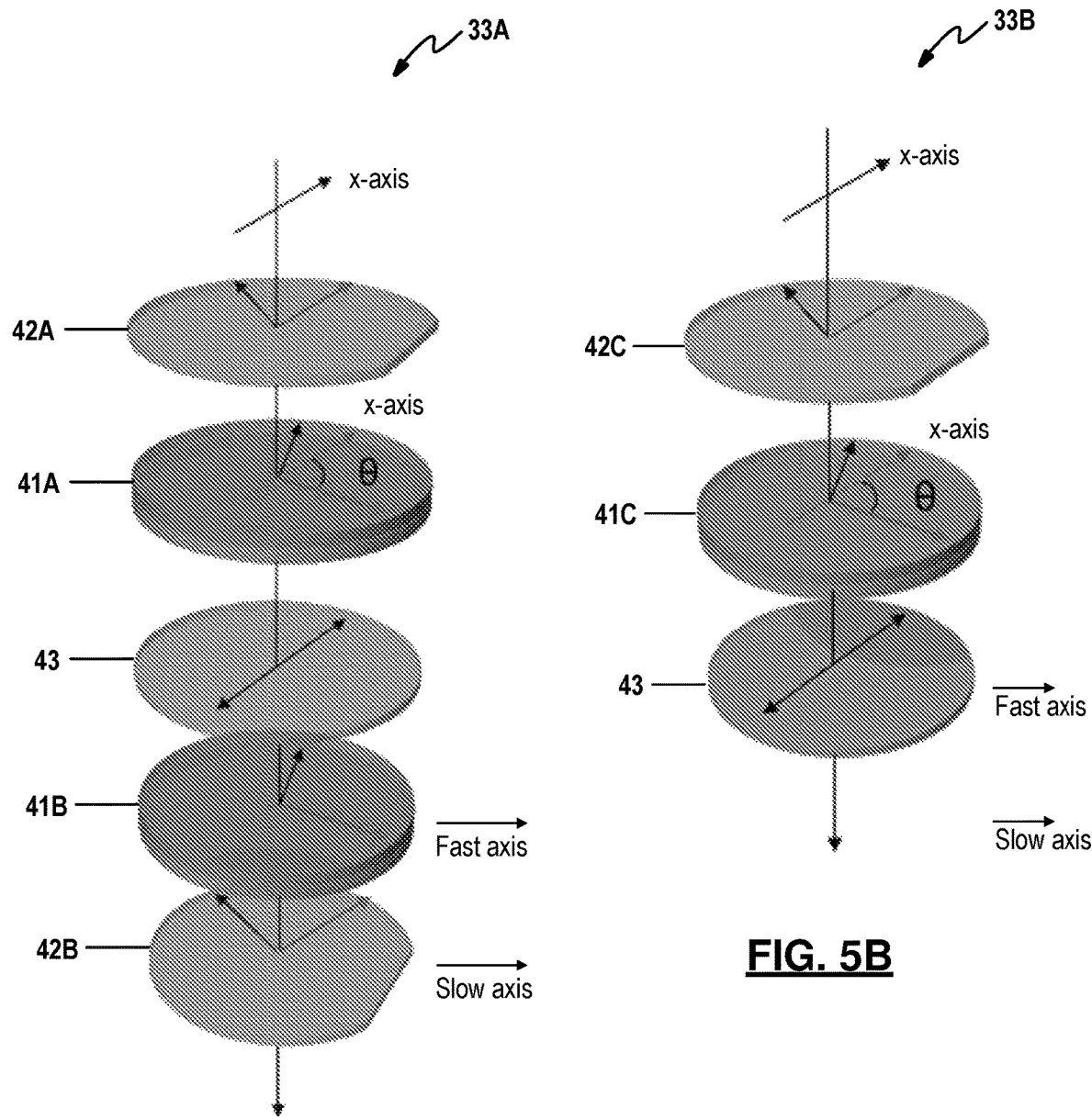
FIG. 5A is a diagram of the example embodiment of the voltage-tunable polarizer.
FIG. 5B is a diagram of the second example embodiment of the voltage-tunable polarizer functioning as an intensity modulator.

FIGS. 4A and 5A depict a first example embodiment of the voltage-tunable polarizer 33A. In this example, the voltage-tunable polarizer 33A has a compact sandwich structure, consisting of two variable liquid crystal retarders 41, two λ/4 achromatic polymer retarder films 42 (i.e., quarter waveplate) and a high-contrast linear polarizing film 43. More specifically, a first quarter waveplate 42A is configured to receive the light from the optical microscope. A first liquid crystal retarder 41A is positioned adjacent to the first quarter waveplate 42A and configured to receive the light passing through the first quarter waveplate 42A. The linear polarizer 43 has an incoming surface and an outgoing surface. The incoming surface of the linear polarizer 43 is adjacent to the first liquid crystal retarder 41A and thus receives the light passing through the first liquid crystal retarder 41A. The outgoing surface of the linear polarizer 43 is adjacent to a second liquid crystal retarder 41B. The second liquid crystal retarder 41B receives the light passing through the linear polarizer 43. Lastly, a second quarter waveplate 42B is positioned adjacent to the second liquid crystal retarder 41B and is configured to receive the light passing through the second liquid crystal retarder 41B.

The transmission axis of the linear polarizing film 43 and the fast axis of the polymer retarder films 42 are both parallel with respect to the x-axis, while the fast axis of the liquid crystal retarders 41 are aligned at forty-five or odd multiples of forty-five degrees with the x-axis as seen in FIG. 5. That is, the transmission axis of the linear polarizer 43 is parallel with the fast axis of the first quarter waveplate 42A and the fast axis of the second quarter waveplate 42B. The fast axis of the first liquid crystal retarder 41A resides in a plane that is parallel with the transmission axis of the linear polarizer 43 but is aligned at forty-five or odd multiples of forty-five degrees from the transmission axis of the linear polarizer 43. Likewise, the fast axis of the second liquid crystal retarder 41B resides in a plane that is parallel with the transmission axis of the linear polarizer 43 but is aligned at forty-five degrees from the transmission axis of the linear polarizer 43. By applying amplitude-modulated voltage on the liquid crystal retarders 41A, 41B, the polarization transmission axis of the optically active polarizer 33 can be rotated ranging from 0 degree to 180 degree with microsecond to millisecond response time.

Figure 4B:
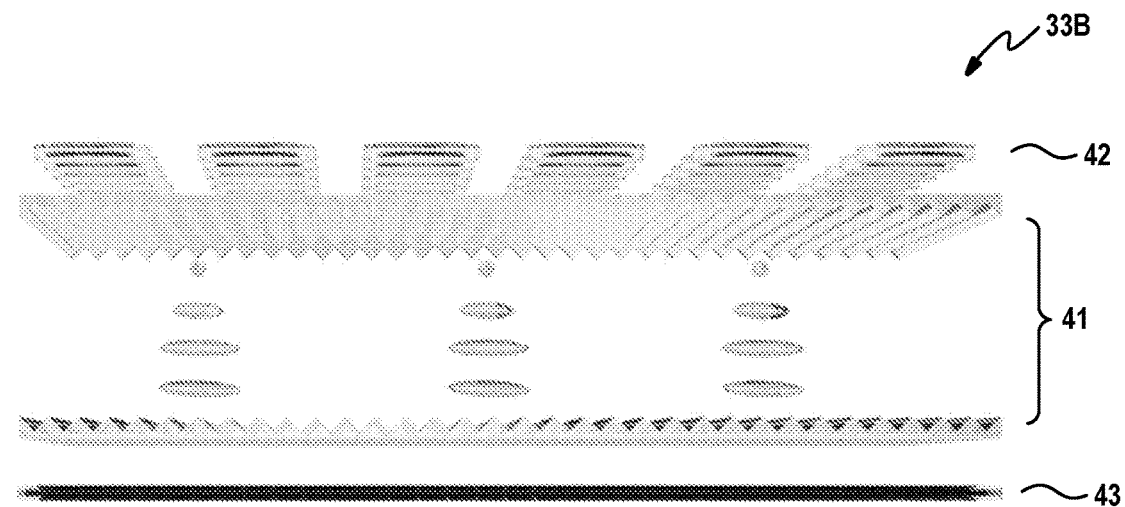
FIG. 4B is a cross-sectional exploded view of a second example embodiment of a voltage-tunable polarizer functioning as an intensity modulator.

FIGS. 4B and 5B depicts another example embodiment for a voltage-tunable polarizer 33B functioning as an intensity modulator. In this example, the polarizer 33B includes three optical elements: a quarter wave plate 42C, a liquid crystal retarder 41C and a thin film linear polarizer 43. The quarter wave plate 42C is configured to receive the light incident upon an exposed surface thereof. The liquid crystal retarder 41C is positioned adjacent to the quarter wave plate 42C and is configured to receive the light passing through the quarter wave plate. The linear polarizer 43 is positioned adjacent to the liquid crystal retarder 41C and is configured to receive the light passing through the liquid crystal retarder 41C. More specifically, the transmission axis of the linear polarizer 43 is parallel with the fast axis of the quarter waveplate 42C, and the fast axis of the liquid crystal retarder 41C resides in a plane that is parallel with the transmission axis of the linear polarizer 43 but is aligned at forty-five or odd multiples of forty-five degrees from the transmission axis of the linear polarizer 43. Thus, this design minimizes the number of optical elements required while providing high transmission combined with low-cost and compact footprint. It is particularly suitable for use in imaging systems such as a microscope and CCD camera. It is also suitable for precision polarimetric imaging of anisotropic nano/micro structures with high spatial precision and fast response time.

Both embodiments of the voltage-tunable polarizer 33A, 33B can be operated over a relatively broad wavelengths with high extinction ratio, and uniform transmission over a large input power range. In addition, the voltage-tunable polarizers 33A, 33B are also compatible with circular and elliptical polarization modulation, offering a versatile platform for imaging the anisotropic nano/micro structures.

Figure 6A:
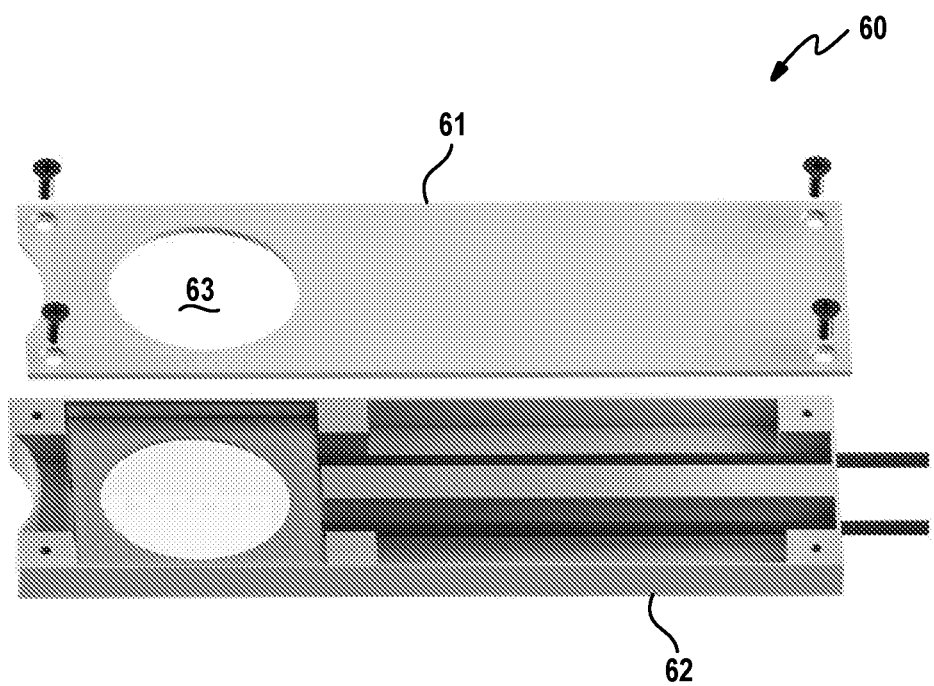
FIG. 6A is a schematic of a microscope insert holding the voltage-tunable polarizer for nano-imaging system.

In one example, the voltage-tunable polarizer 33 is implemented by an insert 60 fit into a polarizer port of the optical microscope 31. The insert 60 is comprised of a cover 61 and a base 62 as seen in FIG. 6A. The insert includes a standard one inch (but not limited to one inch) optical window 63 for light from the microscope to pass through. The voltage-tunable polarizer 33 is positioned in the optical window 63 of the insert 60. The cover 61 serves to protect the polarizer 33 when coupled to the base 62. In one example, the cover 61 is fastened to the base 62 using fasteners although other attachment methods are contemplated as well. The insert 60 may also include two slots for wire connections.

Figure 6B:
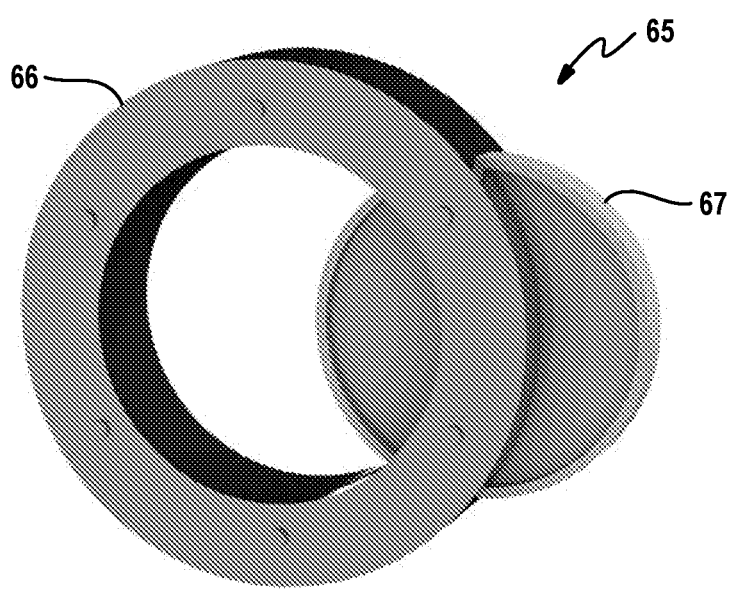
FIG. 6B is a schematic of an insert for holding the voltage-tunable polarizer for photographic application.

In another example, the voltage tunable polarizer 33 is implemented as an insert 65 fit into a photographic camera system as shown in FIG. 6B. The insert 65 is comprised of an outer adapter ring structure 66 for mounting onto photographic cameras and an inner retaining ring structure 67 for securing the voltage-tunable polarizer. The insert 65 may also include contact electrodes for connecting to the camera body and transmitting voltage signals.

With continued reference to FIG. 3, the controller 34 is operably coupled to the voltage-tunable polarizer 33 and supplies voltage to the voltage-tunable polarizer 33. In one embodiment, an amplitude-modulated voltage signal is supplied by the controller 34 to the variable liquid crystal retarders 41 of the voltage-tunable polarizer 33. For example, the phase retardation of the liquid crystal retarders 41 are controlled by applying different voltage levels through a two-channel function generator (e.g., AFG2225, Instek). If both the liquid crystal retarders 41 have the same retardation (δ), the transmission polarization angles of the voltage-tunable polarizer can be rotated by 2/δ.

For both example embodiments, the controller 34 is implemented as a microcontroller. It should be understood that the logic for the controller 34 can be implemented in hardware logic, software logic, or a combination of hardware and software logic. In this regard, controller 34 can be or can include any of a digital signal processor (DSP), microprocessor, microcontroller, feedback sensor, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller 34 performs a function or is configured to perform a function, it should be understood that controller 34 is configured to do so with appropriate logic (such as in software, logic devices, or a combination thereof).

To achieve the optimum performance for nano-imaging and photography, the extinction ratio, power and wavelength dependence were first systematically characterized. The angular rotation of the transmission polarization axis can be realized by applying voltages on the liquid crystal retarders. FIG. 7A gives the dependence of the voltages on the rotation of the transmission polarization axis ($\theta$), showing excellent linearity within $\theta$ from 0° to 180°. For further characterization, the voltage-tunable polarizer 33 is placed after a linear polarizer to measure the transmitted light intensity. The angle ($\alpha$) between transmission axes of these two polarizers was initially set to be orthogonal. As is shown in FIG. 7B, when the actuation voltages increase, the transmitted intensity varies from minimum to maximum, and then decreases to minimum. Note the rotation-dependent intensity is directly proportional to $\cos(2\alpha)$, which agrees well with Malus's law (black dashed line). Meanwhile, as is shown in FIG. 7C, for a given angle of the transmission polarization axis (e.g., 0°, red line), the voltage-tunable polarizer 33 exhibits a uniform transmission over a large input power range. In addition, by using white light combined with spectrometers, $\alpha$-dependent (the angle between the transmission axes of the two polarizers) transmission at different wavelengths ($\lambda$) was also investigated (FIG. 7D). It shows that the voltage-tunable polarizer can be operated over wide range of wavelengths. The operation of the voltage-tunable polarizer however is not limited to this range when appropriate optical elements corresponding to the target wavelength range are used.

Next, the temporal performance of the voltage-tunable polarizer 33 is demonstrated under amplitude-modulated voltages. FIG. 8A illustrates the turn-on and turn-off switching of the voltage-tunable polarizer 33 (i.e., rotating $\theta$ from perpendicular to parallel direction with respect to the incoming light polarization). The actuation voltages for one of the liquid crystal retarders is shown in FIG. 8A top, and the signal for the transmitted intensity is shown in FIG. 8A bottom. It can be seen that, both the turn-on (blue area) and turn-off (orange area) switching exhibit fast response times, showing great potential for high-speed rotation of the transmission polarization angles. Then, FIG. 8B shows the continuous rotation of transmission polarization axis of the voltage-tunable polarizer. The actuation voltage signal was composed of 19 discrete voltage levels (corresponding to polarization directions from 0° to 90° and back to 0°) (FIG. 8B, top). The transmitted light intensity was simultaneously recorded by an oscilloscope and fits well with a sinusoidal function (FIG. 8B, bottom), indicating that the voltage-tunable polarizer responded well to the voltage control. Also, no obvious fluctuation of performance was observed over a long period of time (FIG. 8B, insets), making the system a good candidate for long-term imaging applications with high repeatability. Furthermore, the transmission polarization rotation speed can be further improved at the cost of the extinction ratio. For reference, FIG. 8C gives the dependence of the extinction ratio on the time period of each voltage signal, reflecting the trade-off relations between the performance and the rotation speed.

With the confirmation of the temporal performance of the nano-imaging system, polarimetric images are acquired of anchored, single gold nanorods with the voltage-tunable polarizer. The images were taken at $\theta$ of 0° (parallel to the nanorod) and 90° (perpendicular to the nanorod) (FIG. 8D). The imaging setup was composed of a dark-field microscope followed by a voltage-tunable polarizer and a CCD camera. The voltage control (FIG. 8D, blue waveform) and the image acquiring from the CCD was automated to realize high-speed actuation. The selected sequential images (FIG. 8D, insets) were then analyzed with the intensity change plotted in the figure (red line). It can be seen that the proposed nano-imaging system 30 is able to reliably change transmission polarization direction from 0° (inset, left and right) to 90° (inset, center).

For nano-imaging applications, large-scale precision polarimetric imaging capability was then demonstrated over a large field-of-view containing a large population of anchored gold nanorods as seen in FIG. 9A. The nanorods were imaged and their positions were traced with both the mechanically rotated polarizer (FIG. 9B) and the tunable polarizer (FIG. 9C). Since the voltage-tunable polarizer does not induce significant shift over the entire range of polarization angles, it can be seen in FIG. 9C that the nanorods maintain their absolute positions (cyan traces) throughout the rotation of the transmission polarization axes (shown as the intensity change of the nanorods). Conversely, image instability of the mechanically rotated polarizer is evidenced by the red spiral traces in FIG. 9B and the maximum beam deviation error is as large as microns. The polarization ($\theta$)-dependent scattering intensities of the gold nanorods (labelled as i, ii and iii) were also measured as seen in FIG. 9C, from which the accurate positional information and the in-plane polarization information (~53° for i, ~25° for ii, and ~58° for iii respectively, as illustrated in the insets and lower right corner) can be extracted.

Spatial stability beyond the pixel limit is illustrated in FIGS. 10-12 by comparing the voltage-tunable polarizer with the mechanically rotated polarizer. Images of the single gold nanorods (indicated by the red arrow) at 0° (FIG. 10) and 175° using the mechanically rotated polarizer and the voltage-tunable polarizer are shown with the red cross-hair indicating the center pixel. For quantitative comparison, the root-mean-square deviation (RMSD) of each pixel is calculated between the measured intensity of the pixels and a fitted sinusoidal function for both the mechanically rotated polarizer and the voltage-tunable polarizer (FIG. 12). The nano-images with the voltage-tunable polarizer show a significantly smaller RMSD as a result of sub-pixel spatial stability, indicating a better fit to sinusoidal functions. Additionally, this smaller RMSD indicates more accurate polarimetric information of the nanorods across all pixels of the images compared to the mechanically rotated polarizer.

For photographic applications, the anti-glare capability of the voltage-tunable polarizer is demonstrated in FIG. 13. In this application, the voltage-tunable polarizer acts to reduce the partially polarized scattering/reflection for better imaging quality with more details. When the polarizer is turned off, the letters are not clearly visible due to reflection. After turning on the voltage-tunable polarizer with appropriate voltage, the reflection is suppressed and thus letters are visible. Due to the fast response time of the liquid crystal, such a suppression is realized on the order of microseconds to milliseconds.

FIG. 14 demonstrates another example photographic application where the voltage-tunable polarizer is used as a neutral density filter in front of a camera for linearly polarized incident light. When the polarizer is tuned with an overall tuning angle of 90 degree (as an example, the four images are taken with tuning angles from 0 degree to 90 degrees), the transmission intensity changes from maximum to minimum, allowing pictures to be taken with variable amount of light exposure.

In an example implementation of the voltage tunable polarizer, commercially available parts, including glass-based linear polarizers, liquid crystal retarders and quarter wave plates are used to manufacture the voltage-tunable polarizer.

In an alternative fabrication approaching aiming for minimizing the device thickness, the glass-based linear polarizer can be replaced by commercially available polymer thin film polarizer (e.g., 180 μm). The quarter waveplate can be replaced with thin film quarter wave retarder (e.g., 75 μm). Additionally, the liquid crystal retarder can be manufactured using a bottom-up thin-film fabrication method as seen in FIGS. 15A and 15B. Referring to FIG. 16, a conductive ITO layer is first deposited onto the glass substrate (e.g., total thickness of 1.1 mm). This ITO layer will serve as electrodes to apply voltage to the liquid crystals. A polymer alignment layer (e.g., <500 nm) is subsequently laid on top of the ITO. After placing spacers (e.g., <100 μm), a layer of liquid crystal solution is then spin-coated onto the alignment layer. Another alignment layer, ITO layer and a glass cover is then added on top of the device to form the complete, sealed liquid crystal variable retarder. With this thin film fabrication method, the total thickness of the device can be reduced to several millimeters.

Jones Calculus is used to illustrate the viability of the voltage tunable polarizer. The Jones matrix of the embodiment in FIG. 5A is expressed as $$J = \begin{pmatrix} \cos^2\left(\frac{\delta}{2}\right) & \frac{1}{2}\sin\left(2\cdot\frac{\delta}{2}\right) \\ \frac{1}{2}\sin\left(2\cdot\frac{\delta}{2}\right) & \cos^2\left(\frac{\delta}{2}\right) \end{pmatrix},$$

Where the δ is the phase retardation of both liquid crystal retarders. In this case, the voltage tunable polarizer in terms of Jones matrix has the same expression with a linear polarizer, which the transmission axis is δ/2 angle with respect to the x-axis. The Jones matrix of the compact embodiment in FIG. 5B is expressed as $$J = \frac{\sqrt{2}}{2}\begin{pmatrix} \cos\left(\frac{\delta}{2}\right) - i\cos\left(\frac{\delta}{2}\right) & \sin\left(\frac{\delta}{2}\right) - i\sin\left(\frac{\delta}{2}\right) \\ 0 & 0 \end{pmatrix},$$

Where the δ is the phase retardation of the liquid crystal retarder. In this case, when setting the incident light to be polarized at an arbitrary angle α, the transmission intensity is expressed as $$I = \left(\cos\left(\frac{\delta}{2}\right)\cos(\alpha) + \sin\left(\frac{\delta}{2}\right)\sin(\alpha)\right)^2,$$

It can be seen that the transmission intensity is modulated through the change of phase retardation, which has the same behavior as a linear polarizer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A voltage-tunable polarizer, comprising:
   a quarter waveplate configured to receive light incident on an incoming surface thereof;
   a liquid crystal retarder disposed directly on the quarter waveplate and configured to receive the light passing through the quarter waveplate;
   a linear polarizer disposed directly on the liquid crystal retarder and configured to receive the light passing through the liquid crystal retarder;
   a second liquid crystal retarder, where the linear polarizer is sandwiched between the liquid crystal retarder and the second liquid crystal retarder;
   a second quarter waveplate disposed on the second liquid retarder and configured to receive the light incident on an exposed surface thereof, where the light incident on the second quarter waveplate passes through the second quarter waveplate and the second liquid crystal retarder before being incident upon the linear polarizer; and
   a controller that is operably coupled to the liquid crystal retarder and supplies a voltage to the liquid crystal retarder, where, in response to the voltage applied to the liquid crystal retarder, the voltage-tunable polarizer changes polarization state of the light propagating through the voltage-tunable polarizer without mechanical rotation of the voltage-tunable polarizer itself.

2. The voltage-tunable polarizer of claim 1 wherein transmission axis of the linear polarizer is parallel with fast axis of the quarter waveplate, and fast axis of the liquid crystal retarder resides in a plane that is parallel with the transmission axis of the linear polarizer but is aligned at forty-five degrees or odd multiples of forty-five degrees from the transmission axis of the linear polarizer.

3. The voltage-tunable polarizer of claim 1 wherein polarization transmission axis rotates from zero degrees to 180 degrees in response to the voltage applied to the liquid crystal retarder voltage.

4. The voltage-tunable polarizer of claim 1 wherein the transmission light intensity can be modulated in response to the voltage applied to the liquid crystal retarder.

5. The voltage-tunable polarizer of claim 1 wherein the transmission axis of the linear polarizer is parallel with fast axis of the second quarter waveplate, and fast axis of the second liquid crystal retarder resides in a plane that is parallel with the transmission axis of the linear polarizer but is aligned at forty-five degrees or odd multiples of forty-five degrees from the transmission axis of the linear polarizer.

* * * * *